June 22, 1954 P. M. GLOVER 2,681,607
POWER CULTIVATOR

Filed July 17, 1950 5 Sheets-Sheet 1

INVENTOR.
Paul M. Glover
BY
Cushman, Darby & Cushman
Attorneys

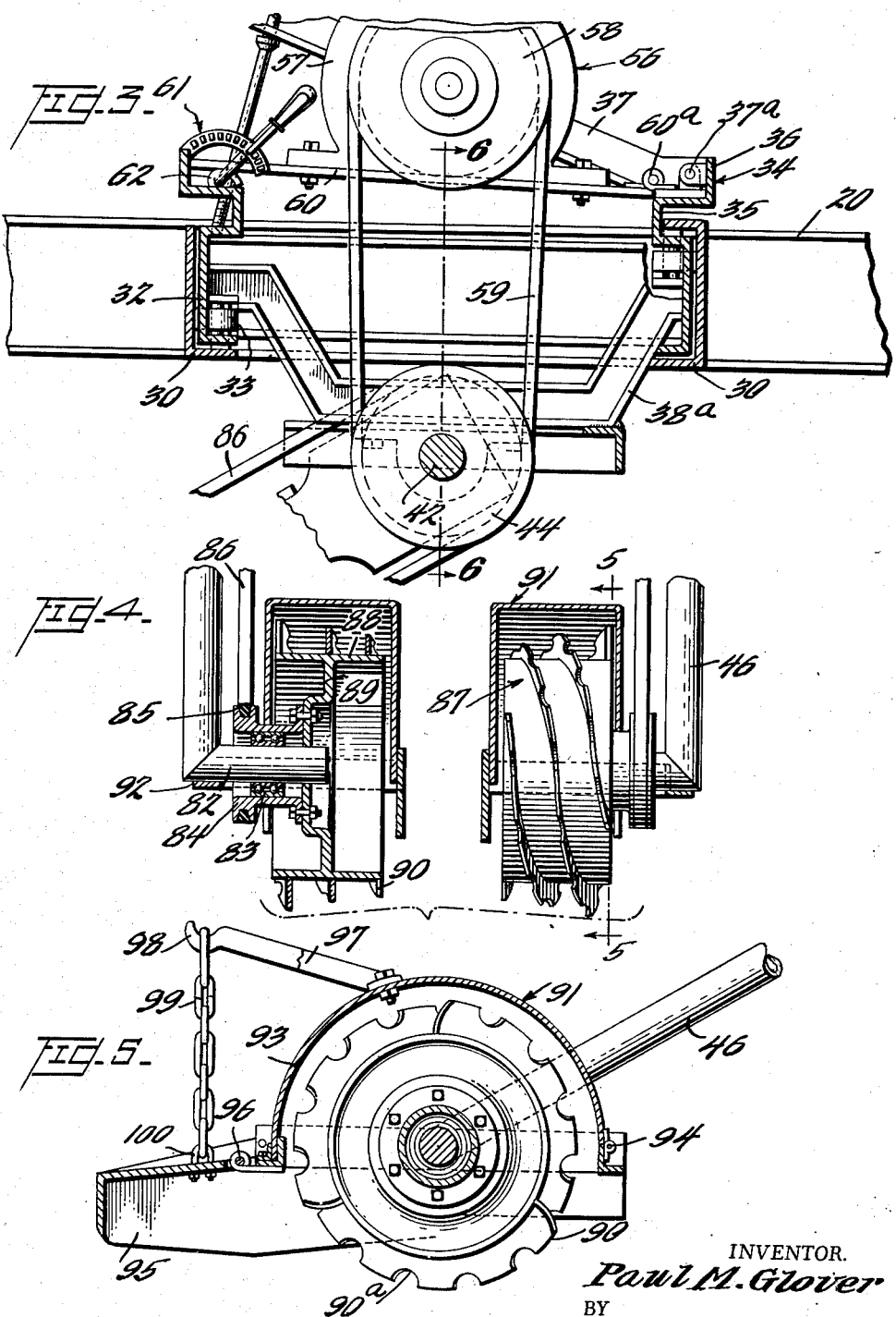

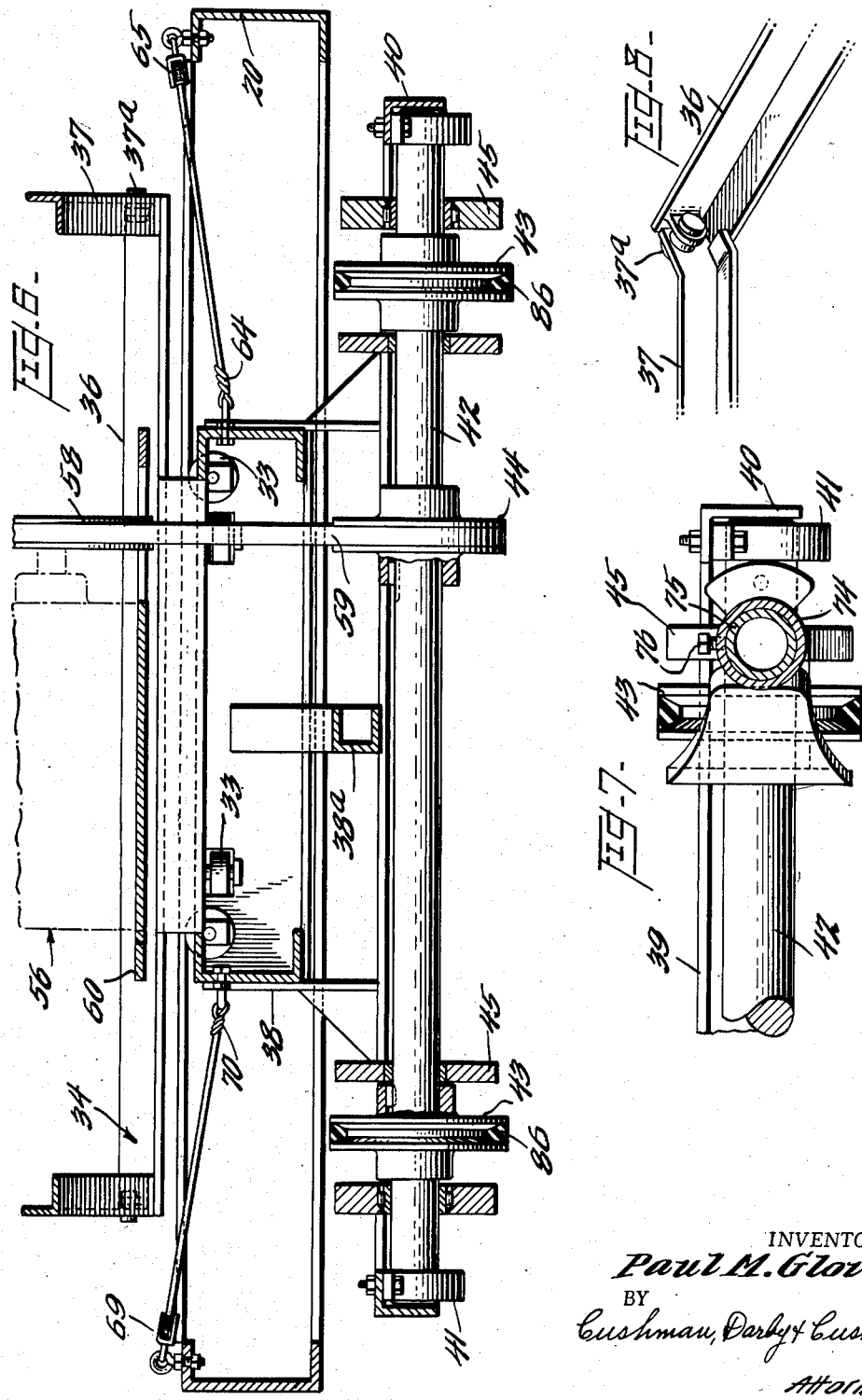

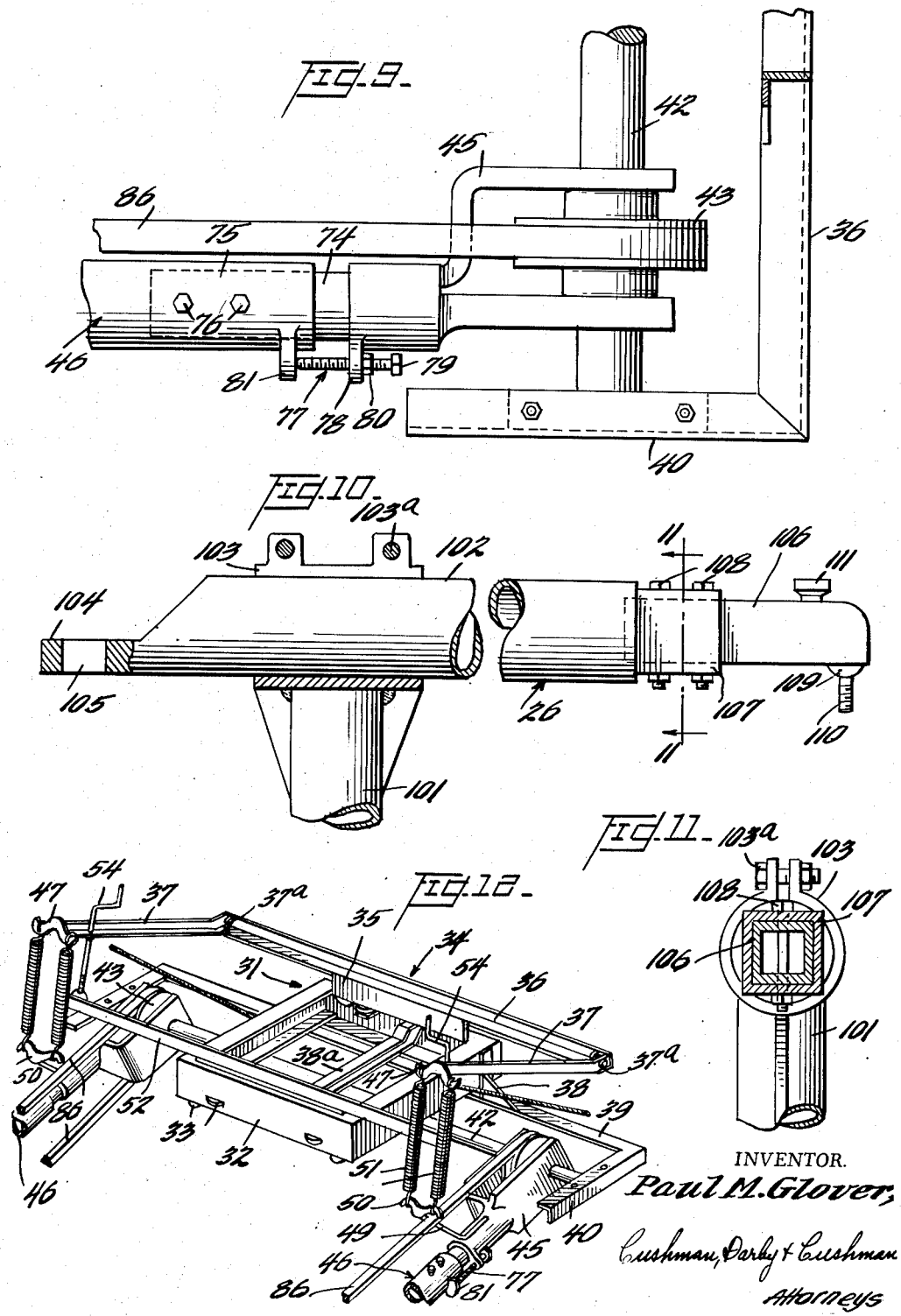

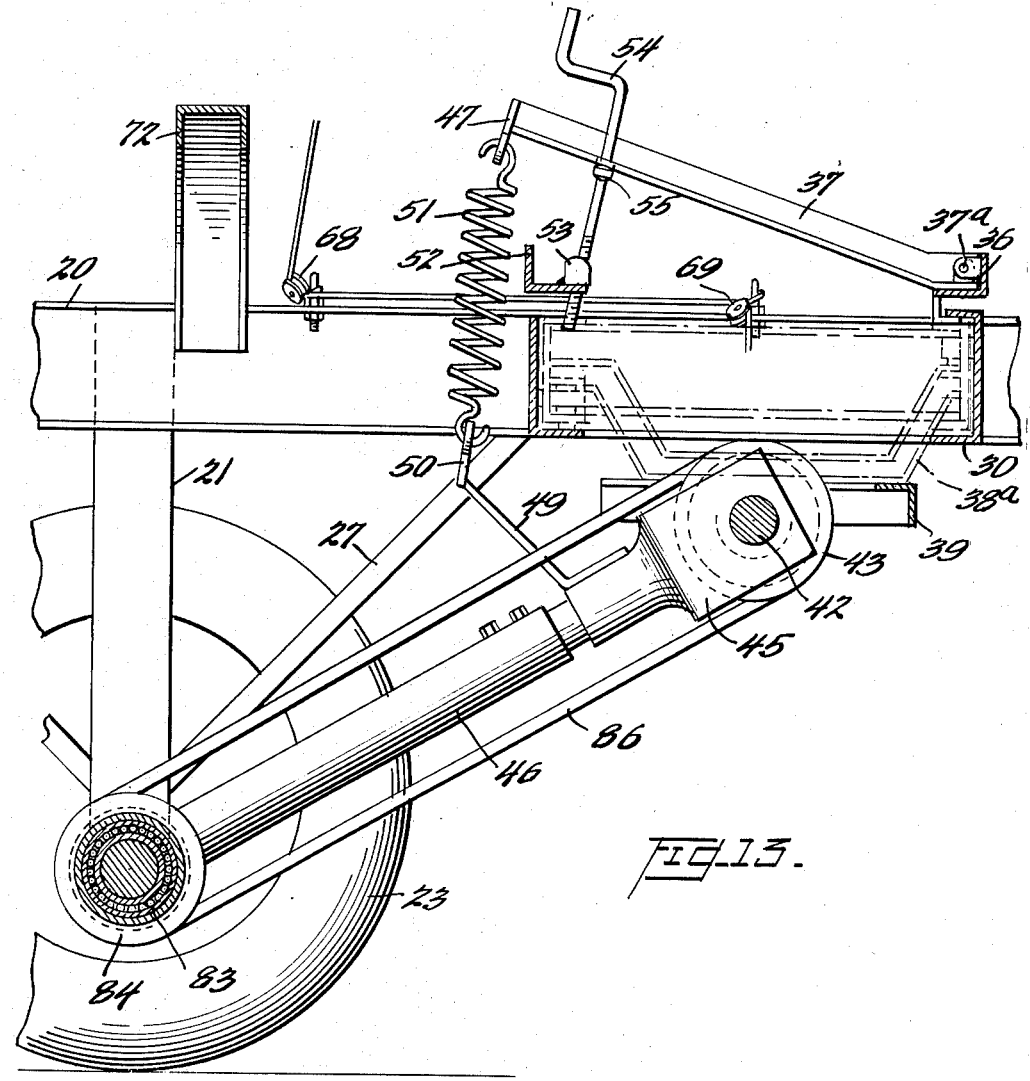

Patented June 22, 1954

2,681,607

UNITED STATES PATENT OFFICE 2,681,607

POWER CULTIVATOR

Paul M. Glover, Fort Pierce, Fla.

Application July 17, 1950, Serial No. 174,250

2 Claims. (Cl. 97—41)

In general this invention is related to a power cultivator of the type adapted to be drawn by a draft vehicle and of the type which is provided with its own power means for driving rotary earth working implements.

It is a particular object of this invention to provide a power cultivator of the type described which will permit a plurality of adjustable rotary earth working implements to be laterally moved with respect to the direction of travel of the cultivator. Lateral movement of the earth working implements is desirable in order that rows of plants which may be planted unevenly or which may be on uneven terrain may be cultivated without injury thereto. If it is desired that the earth working implements straddle a row of plants in order that the cultivation may proceed on either side of a row of plants, it is difficult for the usual prior art vehicle to be drawn along the row without the plants being injured due to the variations of the row planting and the terrain of the soil.

It is a further object of this invention to provide a power cultivator of the type which permits vertical raising and lowering of the earth working implements which are power driven in order that the depth of the soil worked may be controlled. It is further desirable that in a plurality of such earth working implements each earth working implement be independently adjustable during the operation of the machine in order to compensate for uneven terrain worked.

Another object of this invention is to provide means for adjusting the angulation of each of the axes of the rotary earth working implements relative to the horizontal in order that the soil cut may be distributed as desired either towards a row of plants or away therefrom, and in order that the depth of the soil cut directly adjacent a row of plants may be controlled.

It is an object of this invention, also, to provide resilient means for supporting the earth working implements in order that the operator of the power cultivator who is seated in a position above the implements may control the depth of cut by the use of his feet working against the resilient supporting means.

It is still a further object of this invention to provide a laterally movable carriage on the frame for supporting the power driving means for the earth working implements, and to provide clutching means and control means for the lateral movement of the carriage in a position such that the operator seated to the rear of the machine may conveniently control the lateral position of the earth working implements relative to the direction of the vehicle travel, at the same time that he controls the power drive for the earth working implements and the depth of cut taken by the earth working implements.

A further object of this invention is to provide new and novel earth working implements particularly adapted to be used with the implement supporting arms of this invention and their various adjustable features.

It is a further object of this invention to provide a new and novel draft hitching tongue means which may be utilized with the power cultivator of this invention in a way permitting the foregoing objects to be accomplished.

Other various objects and purposes of this invention will become apparent from the following description taken in conjunction with the drawings, wherein:

Figure 3 is a cross-sectional view taken along the line 3—3 of Figure 2;

Figure 4 is a cross-sectional view taken along the line 4—4 of Figure 2;

Figure 5 is a cross-sectional view taken along the line 5—5 of Figure 4;

Figure 6 is a cross-sectional view taken along the line 6—6 of Figure 3;

Figure 7 is a cross-sectional view taken along the line 7—7 of Figure 1;

Figure 8 is an enlarged perspective view of the pivotal connection used for raising and lowering the earth working tillers;

Figure 9 is a cross-sectional view taken along the line 9—9 of Figure 1;

Figure 10 is an enlarged fragmental detailed view, partially in section, of the hitching means of Figure 1;

Figure 11 is a cross-sectional view taken along the line 11—11 of Figure 10;

Figure 12 is a perspective view of the laterally movable carriage of Figure 1, and Figure 13 is a cross-sectional view taken along the line 13—13 of Figure 2.

Figure 1:
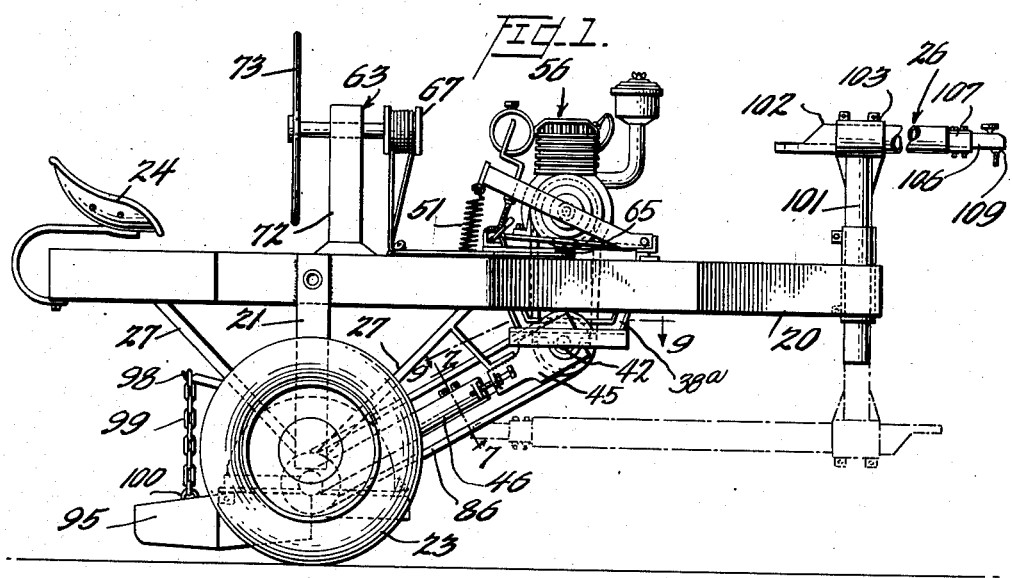
Figure 1 is a side elevational view of the power cultivator of this invention.
Figure 2:
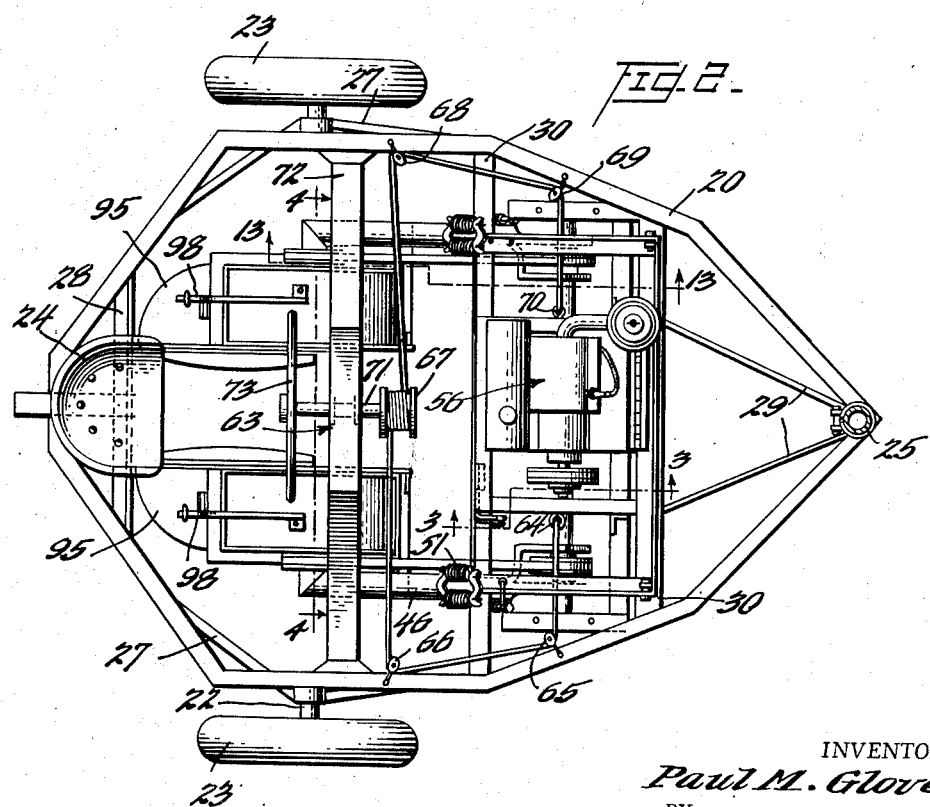
Figure 2 is a top plan view of Figure 1.

With reference to the drawings, the power cultivator of this invention comprises a frame 20 substantially polygonal in shape and preferably constructed of channel bars welded end to end with the flanges thereof extending inwardly. It is, of course, apparent that the frame 20 may take other forms than that described such as a rectangular shape or a square shape if desired. Extending downwardly from the frame 20 on opposite sides thereof are axle supporting members 21. These members are fixed to frame 20 by means such as welding and/or bolting. At the free ends of the axle supporting members 21 there is provided the usual bearing and stub shaft arrangement 22 for rotatably supporting ground wheels 23. At the rear end of the frame 20 there is provided a conventional spring supported seat 24 for the operator of the power cultivator. At the forward end of the frame 20 there is provided a clamping member 25 for releasably holding a hitching tongue 26 described hereinafter. The frame 20 may be provided with additional bracing and strut members such as 27, 28, and 29 for reinforcing the frame and the axle supporting members 21.

Between the forward end of the frame 20 and the axle mounting means 21 there is provided two transversely extending and parallel trackway members 30. These members are preferably constructed from channel bars and are welded at their ends to the frame 20 with the flanges thereof extending inwardly towards each other. If desired, other conventional parallel track members other than that described, such as a railway track, may be employed.

Within the trackway formed by the channel members 30, there is provided a laterally movable carriage member, indicated as a whole at 31, and clearly shown in Figure 12. The carriage member 31 comprises a rectangular main structure 32, preferably constructed from channel bar members welded at their ends to each other with their flanges facing inwardly. The width of the main structure 32 is slightly less than the distance between the opposed transversely extending web members of the parallel trackway 30. The height of the channel bars of the main carriage supporting structure 32 is also slightly less than the distance between the flanges of the channel bars making up the transversely extending trackway 30. The rectangular structure 32 is positioned within the trackway and is provided with rollers 33 positioned, for example, as shown, for the purpose of permitting the rectangular structure 32 to move freely within and along the length of the trackway defined by the members 30.

A super-structure indicated as a whole at 34 is positioned above the rectangular structure 32 by the means of a supporting member 35 secured at one edge thereof to the rectangular member 32 and secured along the other edge thereof to an angle member 36, which is positioned parallel to the sides of the main carriage portion 32. The height of the member 35 is sufficient to position the super-structure in a plane above the plane of the top of the frame 20 of the power cultivator. This permits free movement of the carriage 32 laterally across the frame without interference by the frame 20. At each end of the super-structure member 36 are provided laterally extending members 37 which are pivoted thereto at 37a. The purpose of these pivoted members 37 will be described hereinafter.

Extending from the ends of the main carriage member 32 and downwardly are supporting members 38. To the free ends of these supporting members 38 there is welded or otherwise fixed a jack shaft supporting under-carriage member 39. Additional supporting means for the member 39 is provided by the bracket member 38a, which is fixed to the member 39 by welding or bolting. Extending laterally and rigidly from the free ends of supporting member 39 are shaft supporting members 40. The member 39 and the laterally extending members 40 are underslung in a position far enough below the main carriage to permit the lateral movement of the carriage along the trackway without interference with the bottom of the frame 20.

Parallel to the under structure member 39 and supported by the laterally extending members 40 by means of bearings 41 carried thereby is a jack shaft 42. Toward the extremities of either end of the shaft there are fixed pulleys 43. Intermediate these pulleys 43 is a third pulley 44, which is also fixed to the shaft 42 and located in a position below the rectangular carriage member 32. By means of a bifurcated portion 45 straddling each of the pulleys 43 there is pivotally fixed to the shaft 42 a pair of implement supporting arms 46. These implement supporting arms 46 and the adjustable features thereof will be described hereinafter.

The pivotally supported super-structure members 37 described supra are provided at their ends with spring supporting yokes 47. Extending upwardly from and fixed to each of the implement bearing arms 46, in a position below yokes 47, are struts 49, which are provided at their free ends with a spring supporting yoke 50. Between each pair of spring supporting yokes 47 and 50 are fixed tension springs 51. A third super-structure member 52 parallel to the member 36 is secured to the top of the other side of the rectangular carriage member 32 in a position to clear the frame 20 upon lateral movement of the carriage thereacross. Substantially at each of the ends of this member 52 there is provided screw thread receiving means 53 for receiving the crank arm 54, which is threaded at one end and passes through an opening provided intermediate the ends of the members 37. A stop member 55 is fixed to each of the crank arm members 54 in a position below the bottom of each of the members 37. Rotation of the crank arm 54 will raise and lower the members 37 and thereby increase or decrease the tension in the springs 51 and thereby raise or lower the implement bearing arms 46. The function of this adjustable feature for raising and lowering the implement bearing arms 46 will be described hereinafter in conjunction with the structure of the earth working implements and their use.

As clearly shown in Figure 3, driving means indicated as a whole at 56, are provided for rotating the jack shaft 42. The driving means 56 comprises an engine 57, which may be gasoline powered and which is mounted on and carried by the super-structure 34. In order to provide clutching means for the conventional belt and pulley drive arrangement 44, 58 and 59, there is provided a motor mounting pate 60, which is hinged along one side thereof at 60a to the forward super-structure member 36. Cooperating with the free end of the hinged mounting plate 60, there is provided a lever, detent and rack arrangement 61 for adjusting the position of a cam surface 62. It is seen that by the movement of the lever along the rack the cam surface 62 will raise and lower the position of the free end of the motor mounting plate 60. Raising and lowering of this plate 60 will in turn tighten or loosen the belt 59, which drives jack shaft 42, which in turn rotates the earth working tiller implements, as hereinafter described.

From the foregoing description it is apparent that there has been provided a frame 20 supported by wheels 23, the frame in turn carrying a carriage 32, which is laterally movable with respect thereto. Fixed to the carriage 32 and carried therewith, there is provided means for supporting an engine 56, which is used for driving a jack shaft 42 also carried below the main portion of the laterally movable carriage 32. Rotation of the shaft 42 is controlled by a convenient clutching arrangement 61 and it is seen that the rotation of the shaft 42 will in turn rotate pulleys 43, which, by a belting arrangement described hereinafter, will drive rotary earth working implements mounted on the ends of the pivotally supported implement supporting arms 46. Provision is also made for controlling the lateral movement of the carriage 32 across the frame 20.

The means mentioned above for laterally controlling the movement of the carriage 32 transversely across the frame 20 comprises a cable and drum arrangement indicated as a whole by number 63. One end of the cable 64 is fixed to an end of the main carriage 32 and extends outwardly therefrom and around a pulley 65 and thence over a pulley 66 and inwardly and around the drum 67 a sufficient number of times, the intermediate wrapping thereof being fixed to the drum, and then outwardly over a pulley 68 and thence to a pulley 69 and inwardly, the free end thereof being fixed at 70 to the opposite end of the carriage 32. The drum 67 is fixed to and carried by a steering shaft 71, which is rotatably mounted in suitable bearings supported by an arcuate frame member 72, which has the free ends thereof supported by the frame 20. At the other end of the steering shaft 71 is fixed a conventional steering wheel 73 in a position to be operated by an operator seated in seat 24. It is, therefore, seen that by the rotation of the steering wheel either to the left or the right the carriage 32 which is supported by rollers 33 in the channel trackway 30 may be moved laterally at will across the frame 20.

The implement supporting arms 46 described above as being pivotally secured to the jack shaft 42 by means of the bifurcated structure 45 passing on either side of the pulley 43 are provided with means for extending the length thereof and also for angulating the position of the rotary implements carried thereby relative to the surface of the ground being worked. This latter feature is desirable in order to be able to direct the stream of earth worked either in a direction towards the rows of plants straddled by the two earth working implements or away therefrom.

The structure for accomplishing the above purposes comprises a male telescoping stub shaft 74 projecting axially from the bifurcated structure 45, a female telescoping section 75 receiving the male section 74, set screws or bolts 76 received in screw threaded openings in female member 75 for adjusting the position of the member 75 with respect to member 74 and a stop member indicated as a whole at 77 for assuring longitudinal position of member 75 relative to member 74. This stop member 77 comprises a brad 78 projecting laterally from a portion of the implement supporting arm 46 lying between the bifurcated portion 45 and the male portion 74, the said brad structure being drilled and tapped for receiving a screw threaded bolt member 79 having an adjustable nut 80 thereon. The screw threaded end of the bolt 79 abuts against a brad stop member 81 projecting laterally from the female member 75. Therefore, upon determining the desired length of the implement arm 46 which is dependent upon the soil being worked and the contour of the land, the member 75 is adjusted and bolt 79 with the aid of lock nut 80 is positioned to prevent the force occasioned by the rotation of the implements carried by the other end of the implement supporting arm 46 from forcing the female member 75 over the male member 74. Upon completing this adjustment and upon securing the desired angulation of the earth working implement, set screws or bolts 76 are tightened down. It is to be appreciated that if a substantial change is made in the length of member 46, various size belts described hereinafter for driving the earth working elements may be used.

At the free ends of the implement supporting arms 46 there is provided an inwardly and laterally extending axle 82. About the axle 82 is placed a roller bearing 83 on which is mounted the hub 84 of the earth working implement. Carried by the hub 84 is a pulley rim 85. An endless belt 86 is provided for operably connecting the pulley 43 to the pulley 85. It is thereby seen that by the rotation of the jack shaft 42 that pulley 43 will in turn drive pulley 85 which will in turn drive the earth working implement indicated as a whole at 87.

The earth working implement 87 comprises a cylindrical drum 88 mounted on and carried by a flange 89 which is fixed to the hub 84 by bolts or other means. On the drum 88 are provided a plurality of spaced apart helically wound fins or blades 90. Each of these fins increases gradually in radial length from one end of the winding to the other end of the winding and is provided with spaced apart notched interruptions 90a on the free edge thereof.

Positioned about the upper portion of the earth working implement 87 and extending rearwardly therefrom is a housing indicated as 91, as shown in particular in Figures 4 and 5. This housing 91 is rigidly supported in a conventional manner by implement supporting arm 46 by means of struts 92 extending from the arms 46 and around the pulley and hub structure 84 and fastened at their ends to the sides and ends of the housing. That portion of the housing 93 which surrounds the earth working implement is hinged at its forward end at 94 in order that the top portion of the housing may be lifted upwardly and permit inspection of the earth working implement 87. Also the rearwardly extending earth deflecting portion of the housing 91 indicated at 95 is hinged at 96 for the purpose of permitting adjustment of the same and thereby directing the stream of earth as desired. An arm 97 fixed to the upper portion of the housing 93 and extending rearwardly to a position above the earth deflecting portion of the housing 95 is provided with a hooked portion 98 at the free end thereof for supporting a chain 99 which is fixed at its other end 100 to the earth deflecting means 95. Adjustment of the length of this chain permits the desired positioning of the earth deflecting portion 95 of the housing 91.

From the above it is, therefore, seen that the apparatus described permits the utilization of power driven earth working implements which may be independently angulated in respect to the ground surface and which may be independently extended rearwardly of the laterally movable carriage to a desired position and which at the same time may be independently suspended by the spring tension adjusting means in order to raise and lower the earth working implement relative to the ground surface. Furthermore, an operator occupying the seat 24 may control the digging depth of the rotary implements by positioning his feet on the upper portion of the housing 91 and pressing downwardly if desired against the tension of the springs 51 which tend to hold the implement supporting arms 46 in a position up from the earth depending upon the tension applied thereto by the vertical implement adjusting means.

The hitching tongue indicated as a whole at 26 as shown in Figures 1, 10 and 11 is provided for attachment to a tractor or other drawing means. It is, of course, to be appreciated that the present invention contemplates the provision of, if desired, a self-powered vehicle having additional forward supporting and steering wheels and power means for driving the rear wheels 23.

The hitching tongue 26 comprises a substantially T-shaped member, the vertical leg 101 of which is adapted to be received by a conventional adjustable shaft clamping or retaining means 25. The horizontal portion 102 of the T-shaped hitching means is held by the vertical leg 101 by means of an adjustable horizontally positioned female member 103 fixed thereto and having tightening means 103a. It is, therefore, readily seen that the member 102 may be inserted into member 103 with either end thereof extending forwardly to a desired length for connection with a draft vehicle. At one end of the member 102 there is provided a flattened portion 104 in which there is a vertical hole 105 adapted for receiving a pin or other means for attaching to a draft vehicle. At the other end of the member 102 there is provided a telescoping male member 106 which is square in cross section and which is received by the female member 107 extending from the member 102 and which is also square in cross section. By the means of bolts 108, member 106 may be held in its desired extended or retracted position. At the end of the member 106 there is provided a universal socket and ball arrangement 109 having a screw threaded extension 110 on the ball member to be received by a screw threaded opening on a tow plate of a draft vehicle. In addition, lubricating means 111 are provided for the universal ball and socket joint 109.

As shown in Figure 1 in phantom the hitching tongue 26 may be positioned, if desired, with the horizontal member 102 below the frame 20. This permits the powered cultivator to be towed by draft vehicles which have their hitching position at a lower level than the frame 20.

The description of the foregoing invention as illustrated by the drawings is believed to fully set forth the operation of the same along with the beneficial results which may be obtained by the use of the same. The drawings, however, are illustrative of only one form of the invention and applicant's contribution to the art is not to be limited thereby. The scope of the invention is set forth in the following claims, wherein I claim:

1. A power cultivator comprising a frame supported by wheels, a carriage mounted on said frame for lateral movement with respect to the direction of travel of the cultivator, laterally spaced implement supporting arms each independently pivotally mounted on said carriage, rotary earth working implements carried by the free ends of said implement arms, means engaged with said carriage for resiliently supporting each of said implement arms, means for individually adjusting said resilient supporting means to vary the normal vertical position of the associated implement arms relative to said carriage, means for laterally moving said carriage on said frame whereby said implement arms are moved laterally in unison, power means mounted on said carriage for rotating said earth working implements, and power transmission means operatively connecting said power means to said earth working implements.

2. A power cultivator as defined in claim 1, including means for adjusting the angulation of the axis of said rotary earth working implements relative to the horizontal.

References Cited in the file of this patent

UNITED STATES PATENTS

| Number | Name | Date |
|---|---|---|
| 1,263,352 | Shippy | Apr. 16, 1918 |
| 1,776,830 | Chenault | Sept. 30, 1930 |
| 1,795,182 | Ross | Mar. 3, 1931 |
| 1,836,304 | Brack | Dec. 15, 1931 |
| 2,025,494 | Ariens | Dec. 24, 1935 |
| 2,176,261 | Kelsey | Oct. 17, 1939 |
| 2,228,558 | Childerss | Jan. 14, 1941 |
| 2,261,324 | Zuckerman et al. | Nov. 4, 1941 |
| 2,268,923 | Bryant | Jan. 6, 1942 |
| 2,428,226 | Jones | Sept. 30, 1947 |
| 2,457,745 | Suess | Dec. 28, 1948 |
| 2,468,776 | Patterson | May 3, 1949 |
| 2,483,649 | Le Blanc | Oct. 4, 1949 |
| 2,531,557 | Dayton | Nov. 28, 1950 |
| 2,538,230 | Boggs | Jan. 16, 1951 |
| 2,565,337 | Allan | Aug. 21, 1951 |
| 2,568,156 | Kershaw | Sept. 18, 1951 |

FOREIGN PATENTS

| Number | Country | Date |
|---|---|---|
| 585,603 | Great Britain | Feb. 13, 1947 |